United States Patent Office 2,703,800
Patented Mar. 8, 1955

2,703,800

PROCESS OF PRODUCING N₁-HETEROCYCLICALLY SUBSTITUTED BENZENE-SULFONIC ACID AMIDES

Hermann Bretschneider and Wilhelm Klötzer, Innsbruck, Austria, assignors to Osterreichische Stickstoffwerke Aktiengesellschaft, Linz (Donau), Austria, a joint-stock company of Austria No Drawing. Application August 25, 1952, Serial No. 306,296

Claims priority, application Austria September 10, 1951

15 Claims. (Cl. 260—239.75)

This invention relates to a process of producing $N_1$-heterocyclically substituted benzenesulphonic acid amides.

A number of different processes have been proposed for the production of $N_1$-heterocyclically substituted arylsulphonic acid amides of the general formula $R.SO_2NHR^1$ (I) ($R$=aryl radical, $R^1$=heterocyclic radical), of which in particular the p-aminobenzenesulphonic acid amides (formula I, $R=H_2N.C_6H_5$—) have become important on account of their chemotherapeutic action.

One process (1) consists in the coupling of suitable derivatives of benzenesulphonic acid and the heterocyclic compounds, which can be effected by two alternative methods (1a and 1b).

Another process (2) consists in the production of the heterocyclic ring system in suitable open chained $N_1$-substituted benzenesulphonamide derivatives.

The two alternatives of process (1) are as follows:

(1a) A heterocyclic compound substituted by an amino group is acylated in the amino group by a benzenesulphonic acid derivative with reactive substituent (X) (benzenesulphonylation of aminoheterocycles):

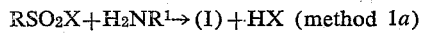

$$RSO_2X + H_2NR^1 \rightarrow (I) + HX \quad \text{(method 1a)}$$

(1b) In a benzenesulphonic acid amide a substitution is effected in the sulphonamide group, with the aid of a heterocyclic compound having a suitable reactive substituent (X), by said compound (which in conformity with the reactions of alkylation and arylation can be designated as heteroarylation of the sulphonic acid amide group):

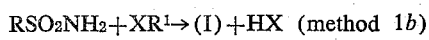

$$RSO_2NH_2 + XR^1 \rightarrow (I) + HX \quad \text{(method 1b)}$$

In method 1a, practically only the reaction of a benzenesulphonic acid chloride (1a, X=Cl) with the amino group of the heterocyclic compound would be used. (See for example Northey, The Sulfonamides, page 13.)

For method 1b of heteroarylation, on the other hand, apart from halogens (X for example=Cl) as reactive substituents of the heterocycle, thioalkyl radicals (X=CH₃S—) have also been proposed as reactive substituents of the heterocyclic compound, as a result of which mercaptans (XH for example=CH₃SH) are split off in the reaction.

None of the known methods of carrying out the aforementioned processes appears however capable of being called fully satisfactory in respect of the auxiliary substances required for obtaining the desired final products and of the number of reaction stages, and also in respect of other factors, as can be partly deduced from the numerous and very different publications themselves. In this connection the following points should be mentioned: the desirable wide applicability of a process for the production of different compounds, because as the result of recent therapeutical knowledge the combined application of different sulphonamides is particularly favourable (see Brit. Med. J. 1947, page 7, "Sulfacombination"); in addition, the reaction conditions, which should be as mild as possible, in order to obtain the reaction products in the condition of maximum purity which is indispensable for therapeutical use, or in order to avoid subsequent purification treatment. Finally, mention should also be made of the yield of pure product consequent upon the foregoing factors, and the convenient conduct of the process, which is influenced not only by the foregoing factors but also by individual factors, such as, for example, the necessary reaction temperature, the ability to recover reaction constituents used in excess, and the absence of toxic reactants, or by-products.

Thus, for example, in the benzenesulphonylation of amino-heterocycles with benzenesulphonic acid halides (method 1a), large amounts of the relatively expensive product pyridine are almost always needed as auxiliary substance, this product being recovered after decomposition of the mixtures by water (Northey, "The Sulfonamides," page 13, line 4 from the bottom, concerning the manufacture of sulfapyridine) in a dilute and difficultly regenerable condition.

The number of reaction stages from coupling to the final product always amounts to at least two; multi-stage processes are described as particularly suitable. The necessity of multi-stage working arises from the fact that only benzenesulphonic acid derivatives can be used which have those $N_4$-substituents which, in the conditions of the experiment, do not react with reactive halogen, but can be converted in a second stage by hydrolysis or reduction into the desired compounds with free amino group, which can be achieved by the use of benzenesulphonic acid amides substituted in the 4-position by nitro- or acyl-amino groups.

If however, as described in United States patent specification No. 2,429,184 or in the equivalent British patent specification No. 565,501, 2 mols of benzenesulphonic acid halide are used to 1 mol of the relatively expensive heterocyclic component, in order to obtain the highest possible reaction of the latter, disulphonylated derivatives are obtained. These can certainly be saponified direct in a single-stage reaction into the final products, but a benzenesulphonyl radical is recovered as sulphanilic acid which, because it can no longer be used for sulphonylation, must be regarded as waste. This can be avoided, but in such case a process comprising in all three stages is the result, as recommended in United States patent specification No. 2,429,184, if the disulphonylation product is in turn reacted in pyridine with a second mol of the heterocyclic amino compound, and only then the $N_1$-amino group produced.

With particular reference to the known processes for reacting benzenesulphonamides with halogenated heterocycles (heteroarylation, method 1b), they have in common the disadvantageous application of high temperatures (on the average 200 to 250° C.) to relatively sensitive reaction partners. It is therefore not surprising that where yields are indicated (Druey, Helv. chim. acta 24 E, 226–235 (1944)), these are very low, being on the average 25 to 30%.

The reaction of the thioethers of heterocycles, which moreover are not easily obtainable, also requires high temperatures of about 200° C. and higher. The yield— indicated in only one of 37 examples in British patent specification No. 589,040—is certainly good, but the 2-(4¹-aminobenzenesulphonic acid amide) - 6 - oxypyrimidine, thus obtained in a two-stage reaction, apparently constitutes a constitutionally favourable exception, which moreover is of no technical interest. Applicants' own experiments have shown in fact that the chemotherapeutically highly active and thus technically interesting 2-(4¹-aminobenzenesulphonamide) - 4,6 - dimethylpyrimidine cannot be produced with a utilisable yield, in consequence of considerable decomposition, from 2-mercaptomethyl-4,6-dimethylpyrimidine (which itself can only be obtained with a 24% yield from methylisothiourea and acetyl acetone).

The oxypyrimidine derivative mentioned in the aforesaid British patent specification has been found, as all hydroxylated heterocyclic sulphonic acid amides have by experience not been found (Northey, "The Sulfonamides," page 31, line 12 from bottom), to be chemotherapeutically inactive (Ibidem, Table 26, page 77, line 4 from bottom) and therefore technically uninteresting.

On the other hand, pyrimidines substituted in position 4 by the sulphanilyl radical have been found by applicants' own experiments to be incapable of production at all by this method, so that its range of applicability must be designated as narrow. With regard to the number of stages, in the pairing of 4-aminobenzenesulphonamides with halogenated heterocycles, a two-stage process is indispensable. This is also shown by the following experiment, according to which by heating sulphanilamide with 2-chloro-4,6-dimethylpyrimidine in dimethylaniline to 140–160° C., although heteroarylation is effected, it does not occur in the desired $N_1$-position, but at the amino group located in position 4, to form the 2-($N_4$-aminobenzenesulphonic acid amido)-4,6-dimethylpyrimidine of the formula:

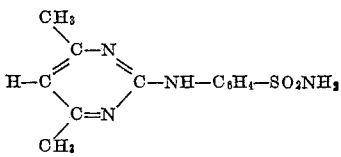

In the pairing of 4-aminobenzenesulphonamides with thioethers in accordance with British patent specification No. 589,040, two-stage working appears, judging from the examples, not to be absolutely necessary but nevertheless advantageous. The formation of the resinlike by-products mentioned in said specification apparently occurs particularly in experiments in which benzenesulphonamide compounds with a free amino group are used (British patent specification No. 589,040, Examples 3, 8, 16, 31, 33). The degree of purity of the products obtainable by this process is moreover often indicated only as "almost pure" (Examples 1, 5, 16, 29).

The fact that the primary purity of the products of the process may however also be defective in the benzenesulphonylation processes (method 1a) is seen from the fact that separate patents were granted for the purification of sulphonamide derivatives to eliminate coloured impurities (see United States patent specification No. 2,417,939).

A particular disadvantage of the carrying out of the heteroarylation of benzenesulphonic acid amides with heterocyclic thio-ethers that must also be mentioned is the handling of the readily volatile, toxic mercaptans, which finally are also very disagreeable auxiliary substances in consequence of their tendency to oxidise readily.

The process of the present invention is based on the surprising discovery that benzenesulphonic acid amides, which are present as anionic constituents of a salt, in accordance with the general formula $(YRSO_2NH)^{(-)}Kt^{(+)}$ (Kt=cation), can be reacted with pyrimidine derivatives substituted by a quaternary ammonium salt group, which correspond to the general formula $X^{(-)}[(R'')_3N.R']^{(+)}$, in suitable solvents, even at relatively low temperatures, to split off a tertiary amine corresponding to the formula $R_3N$ and a halide corresponding to the formula $KtX$ or $KtX_2$, and to form a benzenesulphonamide substituted in the sulphonic acid amide group by a pyrimidine radical. The reaction can be expressed by the following formula:

$(Y.R.SO_2.NH)^{(-)} \cdot Kt^{(+)} + X^{(-)}[(R'')_3N.R']^{(+)} \rightarrow Y.R.SO_2.NHR' + KtX + R''_3N$ Thus a new process is indicated in accordance with the method of heteroarylation of the benzenesulphonic acid amide group discussed under 1b above.

In accordance with the mechanism of the foregoing reaction there may be used as benzenesulphonamides, apart from the basic substance (Y=H), in principle also those benzenesulphonamides which contain neutral substituents (for example $Y=CH_3—$, $CH_3.CO.NH—$, $NO_2—$, $CH_3O—$, $C_2H_5O_2C—$), or basic substituents (for example $Y=NH_2—$, $CH_3NH—$, $NH_2CH_2—$), while the site of the substitution of these groups is principally position 4 to the sulphonamide group. The heteroarylation products of compounds substituted in this manner constitute in some cases chemotherapeutically valuable substances themselves, or serve for the manufacture of such substances.

In $N_1$-heteroarylated benzenesulphonamides which are substituted in the phenyl radical by a masked amino group (for example $NO_2—$ or $CH_3CO.NH—$), a free amino group can be produced in manner known per se by hydrolysis or reduction. Monovalent or bivalent cations, such as $Kt=Na^+$, $K^+$, or $Ca^{++}$, can be used as cationic partners of the benzenesulphonamide. In the general formula $X^{(-)}[(R'')_3N.R']^{(+)}$, $X^{(-)}$ denotes an anionic radical, such as Cl or Br, R'' principally lower alkyl radicals, for example $CH_3—$, and R' a pyrimidine radical;

and said radical may in addition be substituted by other groups of a neutral or basic nature, such as $CH_3—$, $C_6H_5.CH_2—$, $C_6H_5—$, $CH_3O—$, $C_6H_5O—$, $CH_3S—$, $C_6H_5C—$, $NH_2—$, $C_6H_5NH—$, $C_2H_5O_2C—$.

It is particularly noticeable and advantageous that the reaction, which takes place under such mild conditions, has a strictly specific character even when using 4-aminobenzenesulphonamide (above series of formulae $Y=NH_2$), and in this case also, with a single-stage reaction, yields exclusively the valuable $N_1$-heterocyclically substituted sulphonamides without any reaction taking place at the unprotected $N_4$ amino group.

It could not be foreseen that the quaternary ammonium salts of the aforementioned pyrimidine compounds would react precisely in this manner with benzenesulphonamide alkali metal salts and in particular with 4-aminobenzenesulphonamide alkali metal salts; thus for example in the reaction indicated further above, instead of the heteroarylation, an alkylation at the nitrogen $N_1$-sulphonic acid amide, with simultaneous formation of the hetero ring substituted with a tertiary amino group, could have been regarded as just as possible, in accordance with the reaction:

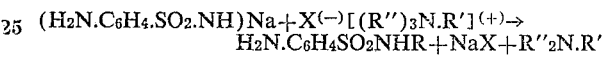

Aliphatic carboxylic acid amides, for example acetamide, of low molecular weight have given particularly good results as compounds which can fulfill the apparently very important function of a solvent even at low temperatures of the mixture, without adding water or alcohol, whereby the yield would be reduced. These auxiliary substances are fully active even in small amounts, corresponding approximately to the weight of the sulphanilamide component. Nevertheless, the reaction also occurs in concentrated aqueous solution, although the yields obtained are only moderate.

It has nevertheless been shown in experiments in which, for example, sodium sulphanilamide was allowed to react under the same conditions, mixed with acetamide, with oxy- or chloropyrimidines, that the influence of the solvent used (acetamide) extends only to the heterocycles substituted by quaternary ammonium radicals used in accordance with the invention, for in no case did the $N_1$-heterocyclically substituted benzenesulphonamide derivatives producible by the process of the present invention result.

In order to obtain the highest possible degree of reaction of the relatively expensive heterocyclic component, it was found best to use the sulphonamide component in an excess of 1–2 mols, whereby yields of about 80% of theoretical (referred to the heterocyclic compound) can be obtained. The reaction temperatures then ascertained as optimum are 80 to 100° C., and the end of the reaction can be clearly seen by the dying-down or cessation of the splitting-off of trimethylamine.

All auxiliary substances of the reaction can be recovered almost quantitatively and without difficulty. The tertiary amine, which leaves the reaction mixture at atmospheric pressure and at the temperature of the reaction, can easily be liquefied or chemically bound by acid, and returned to the process. The acid amide added can also be removed from the mixture at the temperature of the reaction, but only after applying a vacuum. It can however be removed just as well by a selective extraction medium, for example chloroform. The sulphanilamide, which may be used in excess, can be easily and almost quantitatively separated from the more acid product of the process because of its lower acidity, for example as a result of its insolubility in soda solution, whereupon it can be re-used immediately as a free compound or as sodium salt.

The desired products of the process can be separated from the alkaline carbonate solution by adjustment of a suitable pH lying within the acid range (about 5), and are obtained in such a pure form that after a single recrystallisation they can be called analytically pure. Special purification measures, such as the use of reducing decoloration medium or activated charcoal otherwise recommended in literature, can be entirely dispensed with.

Through the combination of these individual factors, the process is very profitable. The range of the process is also clear through the variability of the heterocyclic component. Whereas, for example, by the process of heteroarylation with thioethers only 2-substituted pyrimidines are in all probability obtainable, the process of the present invention permits just as well the production of 4-substituted pyrimidine derivatives.

The following examples, which merely illustrate the hereindescribed process but are not intended to limit its applicability, describe the production of I=2-(sulphanilyl)-4,6-dimethylpyrimidine (Example 1)

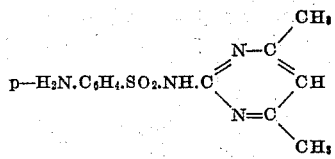

II=4-(sulphanilyl)-2,6-dimethylpyrimidine (Examples 2 and 2a)

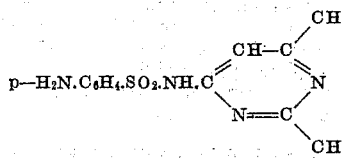

III=4-(sulphanilyl)-2,6-dimethoxypyrimidine (Example 3)

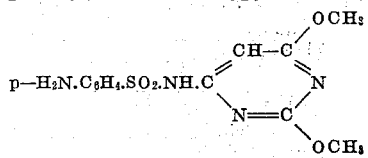

IV=2 - (N4-acetyl-sulphanilyl) - 4,6 - dimethylpyrimidine (Example 4)

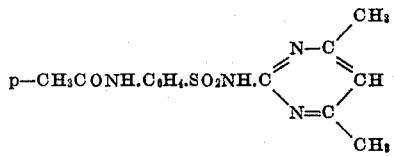

Compound III, not yet known, was found in the guiding chemotherapeutic examination to be highly active against pathogenic micro-organisms, such as haemolytical streptococci, staphylococcus aureus haemolyticus, and Bacterium coli communus.

Example 1

In order to produce product (I), 2.91 g. of sodium sulphanilamide (relative 1 mol) are formed into a homogeneous melt with 3.0 g. of acetamide, and into this melt by heating, after cooling to 80° C., 1.0 g. of 4,6-dimethyl-2-trimethylammonium pyrimidine chloride (relative ⅓ mol) is introduced with vigorous stirring. Intense development of trimethylamine ensues and is terminated by heating for 10 minutes to 80–90° C. The cooled mixture is mixed with 15 cc. of water and adjusted to a soda alkaline reaction. 1.40 g. of sulphanilamide (75% of the amount theoretically possible) is thereupon separated by cooling with ice. On subsequent adjustment to a pH of 5, the filtrate at first gives an amorphous precipitate, which can be converted into a crystallised product by brief heating at 70° C.

After cooling, 1.1 g. (79% of the theoretical) of (I) is obtained, which after dissolving in alcohol and crystallising is analytically pure and has the decomposition point of 198° C.

Example 2

12 g. of acetamide are melted and at about 140° C. 14.5 g. (0.075 mol) of sodium sulphanilamide are introduced. 5.0 g. (0.025 mol) of 2,6-dimethyl-4-trimethyl-ammonium pyrimidine chloride are slowly stirred into the melt, which has been cooled to 100° C. After the generation of trimethylamine has died down, the reaction vessel is introduced into an oil bath at a temperature of 180° C., and the acetamide is rapidly distilled off in vacuo. 11.5 g. (96% of theory) of acetamide are recovered. The residue is dissolved in water, the solution is brought to a pH of 9, and cooled. In this way 7.8 g. of sulphanilamide are recovered. The mother liquor, on being acidified to a pH of 5, separates out, in a form which is at first amorphous but soo crystallises, into 5.5 g. of 2,6-dimethyl-4-(sulphanilyl)-pyrimidine (77.0% referred to the quaternary ammonium salt used). The yield, referred to sulphanilamide and including that recovered, is 86%. The product (II) obtained in this manner, after being once dissolved in 50% alcohol and recrystallised, has the melting point of 245° C. indicated in literature.

Example 2a (*performing the reaction in water*)

1.94 g. of sodium sulphanilamide (relative 1 mol) are dissolved in 1.5 cc. of water at 80° and, while maintained at this temperature, mixed with 1.0 g. (relative ½ mol) of the quaternary ammonium salt used in Example 2. After this has been done, the mixture is further heated for 10 minutes to 80–90° C. and cooled on termination of the generation of trimethylamine. Working up in the manner indicated above yields 1.3 g. of sulphanilamide regenerate (75% of theory). From the filtrate 0.35 g. (25% of theory) of the product II are separated after acidifying to a pH of 5 and standing for a long time at 0°.

Example 3

In order to produce the product (III), 2.91 g. of sodium sulphanilamide (relative 1 mol) are homogenised with 3.0 g. of acetamide as indicated in Example 1, and mixed with 1.15 g. (relative ⅓ mol) of 2,6-dimethoxy-4-trimethylammoniumpyrimidine chloride at 80 to 90° C., with stirring. After completion of the generation of trimethylamine at this temperature, the mixture is worked up in the manner indicated in Example 1. 1.45 g. of sulphanilamide regenerate (78% of the amount theoretically possible with a soda alkaline reaction) is obtained. After adjustment to a pH of 5 and standing in the cold, there are separated from the filtrate 1.10 g. (71% of theory) of the product III, which after dissolution in methanol and crystallisation melts at 201–203° C. and gives correct analytical values:

$C_{12}H_{14}O_4N_4S$ (310.26)
Calculated:
C=46.45%
H= 4.55%
N=18.01%
Found:
C=46.18%
H= 4.58%
N=18.04%

Example 4

For the purpose of producing the product (IV), 2.36 g. of sodium N4-acetylsulphanilamide (anhydrous, relative 1 mol) are homogenised with 4.0 g. of acetamide, with heat, mixed with 1.0 g. (relative ½ mol) of 4,6-dimethyl-2-trimethylammoniumpyrimidine chloride at 100° C., with stirring, and left at that temperature until the generation of trimethyl amine dies down. After working up in the manner described, 1.25 g. of N4-acetyl sulphanilamide (84% of the amount theoretically possible) is obtained as regenerate, while on subsequent acidification of the mother liquid 0.9 g. (57% of theory) of product (IV) is obtained, which after dissolving in 50% alcohol and crystallising has the melting point of 246° C. indicated in literature and the same mixed melting point as a preparation obtained in the manner described in literature. By acid or alkaline hydrolysis the product (I) obtained in Example 1 is obtained.

We claim:

1. The process of producing N1-heterocyclically substituted benzenesulphonic acid amides of the general formula $$Y.R.SO_2NHR'$$

in which R represents a phenyl radical, Y a substituent selected from the group consisting of hydrogen and neutral and basic groups, and R' a pyrimidine radical substituted with a substituent selected from the group consisting of neutral and basic groups, which comprises reacting in the presence of a lower alkanoic acid amide a reaction component consisting of salts of benzenesulphonic acid amides, in which the latter are present as anions, in accordance with the formula $$(Y.R.SO_2.NH)^{(-)}.Me$$

in which Me represents a radical selected from the group consisting of monovalent and bivalent cationic radicals and Y and R have the meaning explained above, with another reaction component consisting of quaternary ammonium salts of the general formula $$(-)X(R''_3{}^{(+)}N.R')$$

in which $X^{(-)}$ denotes an anionic radical, $R''$ alkyl groups, and $R'$ has the meaning defined above, to obtain in a reaction mixture a reaction product of the general formula set forth in the first place hereinbefore.

2. A process as in claim 1, wherein said carboxylic acid amide is acetamide.

3. The process defined in claim 2, in which the reaction is carried out at temperatures between 50° and 150° C.

4. The process defined in claim 2, in which the reaction is carried out at temperatures between 80° and 100° C.

5. The process defined in claim 2, in which the benzene sulphonic acid amide salt is used in excess.

6. The process defined in claim 2, wherein said benzene-sulphonic acid amide salts are salts of 4-aminobenzene-sulfonic acid amide.

7. The process defined in claim 2, which comprises separating from the reaction mixture by physical differences any organic constituents more readily volatile than the reaction product, and separating from the reaction mixture by chemical differences any organic constituents more difficultly volatile than the reaction product, to isolate the reaction porduct in a pure state.

8. The process defined in claim 7, in which the organic constituents more readily volatile than the reaction product are separated by distillation.

9. The process defined in claim 7, in which the organic constituents more readily volatile than the reaction product are separated by extraction.

10. The process defined in claim 7, in which the organic constituents more difficultly volatile than the reaction product are separated by methods utilizing their difference in acidity from the reaction product.

11. The process which comprises reacting in the presence of acetamide sodium 4-aminobenzene-sulphonic acid amide with 2,6-dimethoxy-4-trimethylammoniumpyrimidine chloride to produce 4-(sulphanilyl)-2,6-dimethoxypyrimidine.

12. The process which comprises reacting in the presence of acetamide sodium 4-aminobenzene-sulphonic acid amide with 4,6-dimethyl-2-trimethylammoniumpyrimidine chloride to produce 2-(sulphanilyl)-4,6-dimethylpyrimidine.

13. The process which comprises reacting sodium 4-aminobenzene-sulphonic acid amide with 2,6-dimethyl-4-trimethylammoniumpyrimidine chloride in the presence of acetamide to produce 4-(sulphanilyl)-2,6-dimethylpyrimidine.

14. The process which comprises reacting sodium 4-acetaminobenzenesulphonic acid amide with 4,6-dimethyl-2-trimethylammoniumpyrimidine chloride in the presence of acetamide to produce 2-($N_4$-acetaminosulphanilyl)-4,6-dimethylpyrimidine.

15. As a new compound 4-(sulphanilyl)-2,6-dimethoxypyromidine.

References Cited in the file of this patent

UNITED STATES PATENTS

| 2,407,966 | Sprague | Sept. 17, 1946 |
| 2,478,146 | Williams et al. | Aug. 2, 1949 |

FOREIGN PATENTS

| 560,345 | Great Britain | Mar. 31, 1944 |
| 575,005 | Great Britain | Jan. 30, 1946 |
| 589,040 | Great Britain | June 10, 1947 |